March 27, 1956  T. PETERSEN  2,739,381
PIPE CUTTER
Filed Dec. 20, 1952
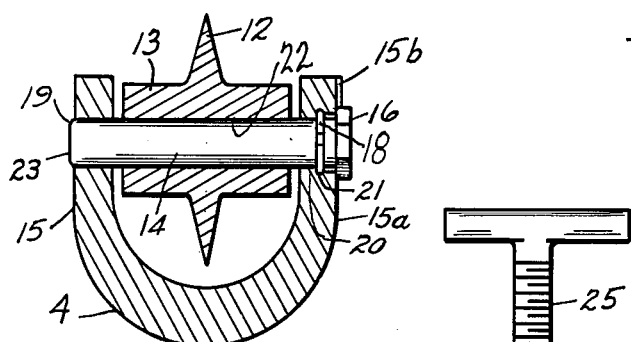
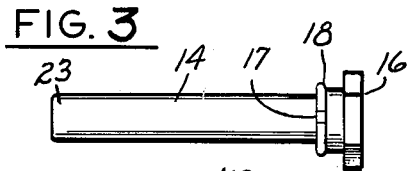
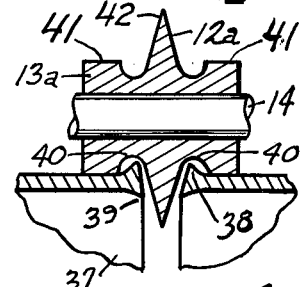
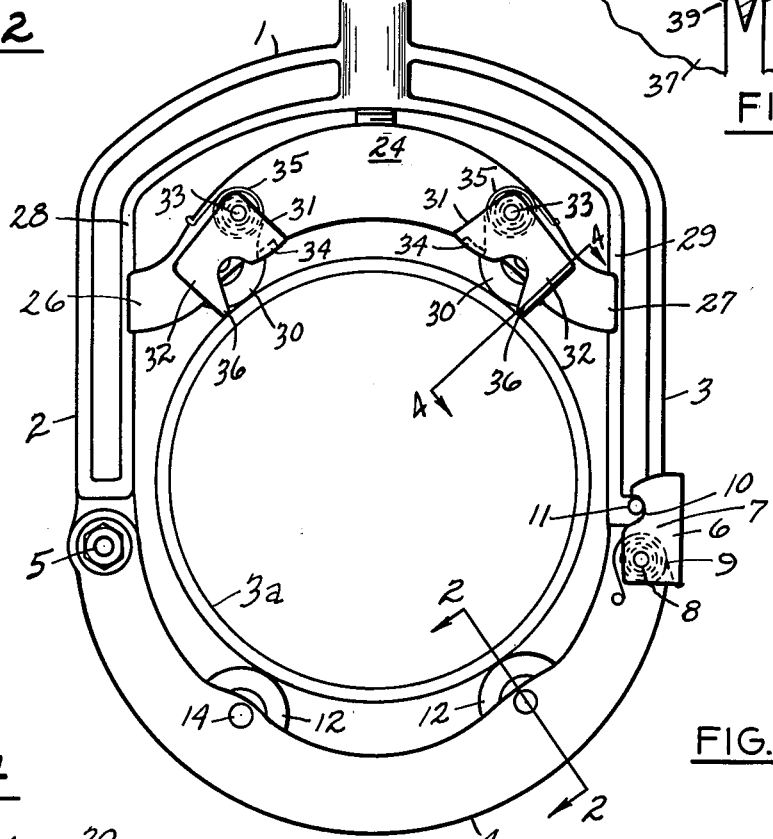
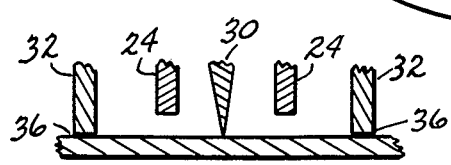
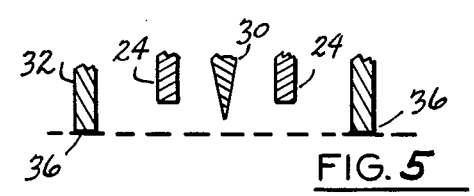
INVENTOR
Thorwald Petersen
BY Ralph Hammar
ATTORNEY

United States Patent Office 2,739,381
Patented Mar. 27, 1956

2,739,381

PIPE CUTTER

Thorvald Petersen, Erie, Pa., assignor to Reed Manufacturing Company, Erie, Pa., a corporation of Pennsylvania Application December 20, 1952, Serial No. 327,105

5 Claims. (Cl. 30—101)

This invention is a pipe cutter having an improved arrangement for supporting and aligning the cutting wheels at right angles to the pipe. The aligning is of special importance in multiple wheel cutters used for large size pipe.

In the drawings Fig. 1 is an end elevation of a four wheel pipe cutter; Fig. 2 is a section on line 2—2 of Fig. 1; Fig. 3 is an enlarged view of the wheel supporting pin; Fig. 4 is a section on line 4—4 of Fig. 1; Fig. 5 is a view similar to Fig. 4 showing the position of the aligning brackets before the cutting wheels are brought into cutting contact with the pipe; and Fig. 6 is a section of another cutting wheel.

The invention is shown applied to a four wheel cutter used for large diameter pipe. The cutter has a yoke shaped frame comprising an upper U-shaped section 1 with depending arms 2 and 3 straddling the pipe 3a and a lower semicircular section 4 having one end hinged at 5 to one of the arms 2 and having the other end secured to the other of the arms 3 by a catch 6 of channel section with flanges 7 straddling the other end of the lower frame section and pivoted thereto at 8. A coil spring 9 urges the catch in a counter-clockwise direction as viewed in Fig. 1 bringing notches 10 in the flanges 7 into locking engagement with a pin 11 fixed in the lower end of the arm 3. As the lower frame section is swung up into place, the catch automatically engages the pin and latches the frame sections together.

The lower frame section 4 is of channel section, as shown in Fig. 2, and at points substantially 90 degrees apart carries two cutting wheels 12 each having a hub 13 journaled on a pin 14 extending across the side walls 15–15a of the lower frame section. The pin has a non-circular head 16 which non-rotatably fits in a recess 15b in the side wall 15a. Adjacent the head 16 the pin has a groove 17 carrying a split snap ring 18 having a normal diameter slightly larger than the pin receiving openings 19 and 20 in the walls 15 and 15a. Within the opening 20 in the wall 15a, there is a groove 21 which receives the snap ring 18 and holds the pin in place. Locating the snap ring 18 adjacent the head 16 makes the pin very easy to assemble. Essentially no force is required to insert the leading end of the pin through the opening 20 and the hub 13 into the opening 19. It is only after the pin is in place that a driving force is required to force the snap ring 18 into the opening 20 so it can expand into locking engagement with the groove 21. This makes the assembly of the pin much easier than as if the snap ring 18 were located at the free end of the pin. With that location the snap ring would resist the entire inserting movement of the pin.

The advantages of the Fig. 3 pin construction can best be demonstrated by following through the steps of assembling the pin into the cutter. The body of the pin 14 is of smaller diameter than the openings 19 and 20 and of the bore 22 in the hub 13 of the wheel 12. Accordingly the leading end 23 of the pin 14 can easily be inserted through the opening 20 and will encounter negligible resistance. After the leading end passes through the opening 20 it must enter the bore 22 in the hub which is blind insofar as the user is concerned. However because the pin is loose in the hole 20 and also has a loose fit in the bore 22 it is easy to insert the leading end 23 into the bore 22 by moving the wheel 12 until the bore comes into alignment with the pin. This can be easily done by feeling the resistance offered to the movement of the pin. Negligible resistance is likewise offered as the pin moves through the bore. When the pin reaches the end of the bore if the end 23 is out of alignment with the opening 19 the operator can easily tell by the added resistance. Again the operator can by touch move the wheel 12 back and forth so as to bring the leading end 23 of the pin into alignment with the opening 19 after which the pin freely slides into the opening. At this stage, the pin is located in both of the openings 19 and 20 and the snap ring 18 is adjacent the outside edge of the opening 20. This is the first time that any substantial resistance will be offered to the assembly of the pin. However because the pin is now aligned and in the proper position it is easy to drive the pin home by a tap on the head 16. Once in place, the pin is held by the snap ring 18. During all of the initial stages of the assembly negligible resistance is offered if the pin is properly aligned and the added resistance offered when the parts are out of alignment enables the operator to tell by touch when the pin is properly aligned. None of these advantages would be obtained if the snap ring 18 were moved from the head end of the pin over to the leading end 23. With the snap ring located at the leading end 23 resistance would be offered to movement of the pin through the opening 20, to movement of the pin through the bore 22 in the hub 13 and to movement of the pin through the opening 19. Because the assembly of the pin would be continuously resisted by the snap ring the operator could not tell when the parts were out of alignment and could not "feel" the pin into its proper position.

The head end location of the snap ring illustrated also simplifies removal. By using a spare pin, the pin can be driven out until the snap ring is clear of the opening 20. Thereafter no driving force is necessary. Only at the start of the removal (and at the end of the insertion) does the snap ring in any way oppose movement of the pin.

On the upper frame member 1 is a semicircular crosshead 24 which is moved up and down by the usual pressure screw 25. The cross head 24 is of channel cross section and has ends 26 and 27 straddling guideways 28 and 29 respectively on the depending arms 2 and 3 of the upper frame member. The crosshead 24 likewise carries cutting wheels 30 of similar construction to the cutting wheels 12 in the lower frame member 4 and likewise spaced to engage the pipe 3a at points spaced approximately 90 degrees apart.

When the lower frame 4 is latched in place around the pipe 3a the wheels 12 and 30 initially are not in cutting engagement with the pipe. As the screw 25 is threaded to move the crosshead downward, the wheels are brought into cutting engagement. It is important that all of the wheels, the lower wheels 12 and the upper wheels 30 be in the same plane and at right angles to the pipe as otherwise a skew cut will be made. In the present construction this is accomplished by a pair of guide brackets 31 each having spaced arms 32 straddling the crosshead 34. The guide brackets are most effective when spaced apart 90° but the angular spacing must be an acute angle so the brackets have the centering function of a V. The guide brackets 31 are pivoted on pins 33 and are biased downward by coil springs 35 to an extent limited by stops 34. Before the upper cutting wheels 30 are brought into cutting engagement with the pipe the tips 36 of the spaced arms 32 of the guide brackets 31 will project slightly inward of the cutting wheels 30 as indicated in Fig. 5. This means that as the crosshead 24 is lowered, the tips 36 of the guide brackets first contact the outer surface of the pipe 3a. Because the tips 36 of the guide bracket are spaced on each side of the upper cutting wheels 30 the user knows that when all of the tips 36 are brought into contact with the outer surface of the pipe 3a, the pipe cutter is positively aligned at right angles to the axis of the pipe. Upon further tightening of the pressure screw 25 the upper wheels 30 are lowered into cutting engagement with the pipe 3a and the guide brackets ride on the outer surface of the pipe as indicated in Fig. 4. Of course if the upper wheels 30 are aligned at right angles to the axis of the pipe, the lower cutting wheels 12 will likewise be similarly aligned and all of the wheels will track and will cut the pipe at right angles. It is true that the tips 36 of the guide brackets ride on the outer surface of the pipe throughout the cutting operation. However since the springs 35 can be relatively light the resistance is not objectionable. Although the pair of guide brackets 31 is shown on the crosshead, the aligning function would be the same if the brackets were supported on other parts of the cutter since the aligning function results from the spacing of the guide brackets at an acute angle from each other with the pipe engaging tips of each bracket spaced along the length of the pipe and the aligning function would not be changed if, for example, the guide brackets were mounted on the lower frame adjacent the wheels 12.

The cutting wheel 12a shown in Fig. 6 is intended to make the cutting easier, particularly on pipe of non-uniform wall thickness so that one of the cutting wheels will break through one of the thin sections while the thicker sections still have appreciable wall thickness to be cut. The wheel 12a has a hub 13a journaled on the supporting pin 14. During the cutting, the wheel rolls beads 38 and 39 on the pipe 37, the bead 38 on the outer surface of the pipe being larger than the bead 39 on the inner surface. Until the wheel 12a breaks through a thin section of the pipe, the pointed rim 42 of the wheel rolls progressively deeper into the pipe and the beads 38 and 39 become progressively larger. When the wheel breaks through a thin section of the pipe, as shown in Fig. 6, the outer beads 38 are received in annular clearance grooves 40 in the hub 13a and surfaces 41 on the hub 13a engage the smooth outer wall surface of the pipe on each side of the beads 38. The clearance grooves 40 keep the beads 38 away from the wheel. The surfaces 41 limit the penetration of the wheel on break through and make the cutting much easier.

What is claimed as new is:

1. In a wheel type pipe cutter, a wheel supporting structure, a pair of angularly spaced guide brackets pivoted on the structure each having arms axially spaced on each side of the wheel, said arms having tips riding on the outer surface of the pipe being cut and spaced equidistant from the axis of the pipe when the wheel is at right angles to the pipe and the tips of the brackets being spaced from each other at an acute angle, and means yieldably urging the guide brackets in the direction to bring the spaced tips into contact with the outer surface of the pipe whereby the user can align the pipe cutter at right angles to the pipe at the start of the cutting operation by moving the cutter to a position in which the axially spaced tips contact the outer surface of the pipe.

2. In a wheel type pipe cutter, a wheel supporting structure, a pair of angularly spaced guide members movably carried by the wheel supporting structure, each guide member having pipe engaging guide surfaces axially spaced apart and respectively on one and on the other side of the wheel and spaced equidistant from the axis of the pipe when the wheel is at right angles to the pipe and the pipe engaging surfaces of one of the guide members being spaced from the pipe engaging surfaces of the other of the guide members at an acute angle, means connecting the pipe engaging surfaces of each guide member to compel the same to move in unison, and means yieldably urging the guide members in the direction to bring the guide surfaces into contact with the outer surface of the pipe whereby the user can align the pipe cutter at right angles to the pipe at the start of the cutting operation by moving the cutter to a position in which the axially spaced guide surfaces of each guide member contact the outer surface of the pipe.

3. In a wheel type pipe cutter, a wheel supporting structure, a pair of angularly spaced guides each pivoted on the structure at points spaced from the wheel axis on an axis parallel to the axis of pipe to be cut, each of said guides having guide surfaces on each side of the wheel and spaced equidistant from the axis of the pipe when the wheel is at right angles to the pipe and the guide surfaces of one of the guides being spaced from the guide surfaces of the other of the guides at an acute angle, and means yieldably urging the guides in the direction to bring the guide surfaces into contact with the outer surface of the pipe whereby the user can align the pipe cutter at right angles to the pipe at the start of the cutting operation by moving the cutter to a position in which the guide surfaces of each guide contact the outer surface of the pipe on both sides of the wheel.

4. In a four wheel pipe cutter, a frame having a pressure screw threaded therein, a movable wheel supporting structure cooperating with the pressure screw and guided on the frame for movement along the longitudinal axis of the pressure screw and having a pair of cutting wheels rotatably supported thereon with one wheel at each side of the longitudinal axis of the pressure screw, another pair of cutting wheels rotatably supported on the frame spaced from the movable wheel supporting structure and likewise spaced from each other at an acute angle with one wheel at each side of the longitudinal axis of the pressure screw, a pair of angularly spaced guide members movably carried by the wheel supporting structure, each guide member having pipe engaging guide surfaces axially spaced apart and respectively on one and on the other side of the wheel and spaced equidistant from the axis of the pipe when the wheel is at right angles to the pipe and the pipe engaging surfaces of one of the guide members being spaced from the guide surfaces of the other of the guide members at an acute angle, means connecting the pipe engaging surfaces to compel the same to move in unison, and means yieldably urging the guide members in the direction to bring the guide surfaces into contact with the outer surface of the pipe whereby the user can align the pipe cutter at right angles to the pipe at the start of the cutting operation by moving the cutter to a position in which the axially spaced guide surfaces of each guide member contact the outer surface of the pipe.

5. The pipe cutter of claim 4 in which the frame and wheel supporting structure comprises an upper U-shaped frame section with depending arms, a lower semi-circular frame section hinged at one end to one of the depending arms and having a releasable latch connection at its other end for connecting the same to the other of said depending arms, a cross head guided on the depending arms of the upper frame section, a pressure screw threaded in the base of the U-shaped section and engaging the cross head midway between the depending arms, a pair of cutting wheels rotatably supported on the cross head spaced from each other at an acute angle with one wheel at each side of the longitudinal axis of the pressure screw, and another pair of cutting wheels rotatably supported on the lower section likewise spaced from each other at an acute angle with one wheel at each side of the longitudinal axis of the pressure screw.

References Cited in the file of this patent

UNITED STATES PATENTS 554,028    Marso _____ Feb. 4, 1896

(Other references on following page)

| | | | | | |
|---|---|---|---|---|---|
| 560,524 | McMurtrie | May 19, 1896 | 2,071,756 | Manville | Feb. 23, 1937 |
| 882,432 | Thomas | Mar. 17, 1908 | 2,379,177 | Povey | June 26, 1945 |
| 888,724 | Moore | May 26, 1908 | 2,447,371 | Sipsma et al. | Aug. 17, 1948 |
| 1,402,968 | Saunders | Jan. 10, 1922 | 2,639,501 | Harding | May 26, 1953 |
| 1,507,969 | Kilgour | Sept. 9, 1924 | | | |
| 1,841,251 | Miller | Jan. 12, 1932 | | FOREIGN PATENTS | |
| 1,841,401 | Conway et al. | Jan. 19, 1932 | 29,211 | Great Britain | Dec. 19, 1912 |
| 1,949,598 | Biggs | Mar. 6, 1934 | 67,333 | Germany | Mar. 3, 1893 |